(12) United States Patent
Tomasino et al.

(10) Patent No.: US 11,360,023 B2
(45) Date of Patent: Jun. 14, 2022

(54) METHOD AND A SYSTEM FOR HOMODYNE SOLID-STATE BIASED COHERENT DETECTION OF ULTRA-BROADBAND TERAHERTZ PULSES

(71) Applicant: INSTITUT NATIONAL DE LA RECHERCHE SCIENTIFIQUE, Québec (CA)

(72) Inventors: Alessandro Tomasino, Montréal (CA); Riccardo Piccoli, Montréal (CA); Roberto Morandotti, Montréal (CA); Luca Razzari, Mont-Royal (CA); Yoann Jestin, Montréal (CA)

(73) Assignee: INSTITUT NATIONAL DE LA RECHERCHE SCIENTIFIQUE

( * ) Notice: Subject to any disclaimer, the term of this patent is extended or adjusted under 35 U.S.C. 154(b) by 0 days.

(21) Appl. No.: 17/086,814

(22) Filed: Nov. 2, 2020

(65) Prior Publication Data

US 2021/0131958 A1 May 6, 2021

Related U.S. Application Data

(60) Provisional application No. 62/930,771, filed on Nov. 5, 2019.

(51) Int. Cl.
*G01N 21/3581* (2014.01)
*G01J 11/00* (2006.01)
(Continued)

(52) U.S. Cl.
CPC ........... *G01N 21/3581* (2013.01); *G01J 3/10* (2013.01); *G01J 3/42* (2013.01); *G01J 11/00* (2013.01)

(58) Field of Classification Search
CPC .......... G01J 11/00; G01J 3/42; G01N 21/3581
See application file for complete search history.

(56) References Cited

U.S. PATENT DOCUMENTS 7,480,434 B2 1/2009 Hochberg et al.
8,027,709 B2 9/2011 Arnone et al.
(Continued)

OTHER PUBLICATIONS

Mathias Hedegaard Kristensen, "Optimisation and Benchmarking of a Terahertz Time-Domain Spectrometer", Jun. 2017 (Year: 2017).*
(Continued)

*Primary Examiner* — Maurice C Smith
(74) *Attorney, Agent, or Firm* — Lavery, De Billy, LLP; Gwendoline Bruneau

(57) ABSTRACT

A device, a system and a method for homodyne solid-state biased coherent detection of terahertz pulses in a range between 0.1 and 11 THz, the device comprising a metallic slit between, and parallel to, two longitudinal metallic electrodes, deposited on a surface of a substrate, and covered with a layer of nonlinear material, wherein a width of the metallic slit and a thickness of the nonlinear material layer are selected in relation to a central wavelength of the THz pulses. The method comprises focusing a THz beam and a pulsed laser beam of pulse energies in a range between 10 and 100 nJ onto the metallic slit, the metallic electrodes being biased by a static DC voltage bias selected in a range between 20 $V_{PP}$ and 200 $V_{PP}$; and retrieving a terahertz pulse waveform using the terahertz pulse repetition rate as synchronism.

19 Claims, 5 Drawing Sheets

(51) Int. Cl.
   G01J 3/10    (2006.01)
   G01J 3/42    (2006.01)

(56) References Cited

U.S. PATENT DOCUMENTS

| | | |
|---|---|---|
| 9,000,373 B2 | 4/2015 | Hwang et al. |
| 9,152,009 B2 | 10/2015 | Ouchi |
| 9,823,124 B2 | 11/2017 | Clerici et al. |
| 2009/0066948 A1 | 3/2009 | Karpowicz et al. |

OTHER PUBLICATIONS

Anna Mazhorova, "Micro-slit based coherent detection of terahertz pulses in biased, solid state media" 2015 (Year: 2015).*

M. Tonouchi, Cutting-edge terahertz technology, nature photonics | vol. 1 | Feb. 2007 | www.nature.com/naturephotonics, © 2007 Nature Publishing Group.

P Y Han and X-C Zhang, Free-space coherent broadband terahertz time-domain spectroscopy, Institute of Physics Publishing Measurement Science and Technology, Meas. Sci. Technol. 12 (2001) 1747-1756, © 2001 IOP Publishing Ltd.

D. J. Cook and R. M. Hochstrasser, Intense terahertz pulses by four-wave rectification in air, Optics Letters / vol. 25, No. 16 / Aug. 15, 2000, 1210, © 2000 Optical Society of America.

V. A. Andreeva et al., Ultrabroad Terahertz Spectrum Generation from an Air-Based Filament Plasma, PRL 116, 063902, Physical Review Letters week ending, Feb. 12, 2016, American Physical Society, 063902-1, © 2016 American Physical Society.

N. Vieweg et al., Ultrabroadband terahertz spectroscopy of a liquid crystal, Dec. 17, 2012 / vol. 20, No. 27 /Optics Express, 28249, (C) 2012 OSA.

Francesco D'Angelo et al., Ultra-broadband THz time-domain spectroscopy of common polymers using THz air photonics, May 19, 2014 | vol. 22, No. 10 | DOI:10.1364/OE.22.012475 | Optics Express 12475, (C) 2014 OSA.

Jun Takayanagi et al., High-resolution time-of-flight terahertz tomography using a femtosecond fiber laser, Apr. 27, 2009 / vol. 17, No. 9 / Optics Express 7533, (C) 2009 OSA.

Zhiping Jiang, Ming Li, and X.-C. Zhang, Dielectric constant measurement of thin films by differential time-domain spectroscopy, Appl. Phys. Lett. 76, 3221 (2000); https://doi.org/10.1063/1.126587 76, 3221-3223, © 2000 American Institute of Physics.

Nicholas Karpowicz et al., Coherent heterodyne time-domain spectrometry covering the entire "terahertz gap", Applied Physics Letters 92, 011131 (2008), 011131-1-011131-3, AIP Publishing.

Alessandro Tomasino et al., Solid-state-biased coherent detection of ultra-broadband terahertz pulses, vol. 4, No. 11 / Nov. 2017 / Optica, 1358, © 2017 Optical Society of America.

Maksim Zalkovskij et al., Ultrabroadband terahertz spectroscopy of chalcogenide glasses, Appl. Phys. Lett. 100, 031901 (2012); https://doi.org/10.1063/1.3676443, © 2012 American Institute of Physics.

Korbinian J. Kaltenecker et al., Ultrabroadband THz time-domain spectroscopy of biomolecular crystals, 978-1-4673-8485-8/16 © 2016 IEEE.

Matteo Clerici et al., Wavelength Scaling of Terahertz Generation by Gas Ionization, PRL 110, 253901 (2013) Physical Review Letters, week ending Jun. 21, 2013, DOI: 10.1103/PhysRevLett.110.253901, © 2013 American Physical Society.

T. I. Oh, Y. J. Yoo, Y. S. You, and K. Y. Kim, Generation of strong terahertz fields exceeding 8 MV/cm at 1 kHz and real-time beam profiling, Appl. Phys. Lett. 105, 041103 (2014); https://doi.org/10.1063/1.4891678, © 2014 AIP Publishing LLC.

F. Blanchard et al., Effect of extreme pump pulse reshaping on intense terahertz emission in lithium niobate at multimilliJoule pump energies, Aug. 1, 2014 / vol. 39, No. 15 / Optics Letters, http://dx.doi.org/10.1364/OL.39.004333, © 2014 Optical Society of America.

J. Hebling et al., Tunable THz pulse generation by optical rectification of ultrashort laser pulses with tilted pulse fronts, Appl. Phys. B 78, 593-599 (2004), DOI: 10.1007/s00340-004-1469-7, © Springer-Verlag 2004.

Shuai Lin et al., Measurement of Quadratic Terahertz Optical Nonlinearities Using Second-Harmonic Lock-in Detection, Physical Review Applied 10, 044007 (2018), DOI: 10.1103/PhysRevApplied.10.044007,© 2018 American Physical Society.

P. Bowlan et al., Ultrafast terahertz response of multilayer graphene in the nonperturbative regime, Physical Review B 89, 041408(R) (2014), DOI: 10.1103/PhysRevB.89.041408, © 2014 American Physical Society.

Ajay Nahata et al., Coherent detection of freely propagating terahertz radiation by electrooptic sampling, Appl. Phys. Lett. 68, 150 (1996); doi: 10.1063/1.116130, 1996 American Institute of Physics.

Y. C. Shen et al., Generation and detection of ultrabroadband terahertz radiation using photoconductive emitters and receivers, Appl. Phys. Lett. 85, 164 (2004); https://doi.org/10.1063/1.1768313, © 2004 American Institute of Physics.

A. Tomasino et al., Wideband THz Time Domain Spectroscopy based on Optical Rectification and Electro-Optic Sampling, Scientific Reports | 3 : 3116 | DOI: 10.1038/srep03116.

Bang Wu et al., Terahertz Electro-Optic Sampling in Thick ZnTe Crystals Below the Reststrahlen Band With a Broadband Femtosecond Laser, IEEE Transactions on Terahertz Science and Technology, 2156-342X, 1-7, © 2018 IEEE.

M. Nakajima et al., Study of Ultrabroadband Terahertz Radiation from Wedge-shaped ZnTe, M9.3 Sources, Detectors and Receivers, 07803-8490-3/04, 161-162, © 2004 IEEE.

Y. C. Shen et al., Ultrabroadband terahertz radiation from low temperature-grown GaAs photoconductive emitters, Appl. Phys. Lett. 83, 3117 (2003); https://doi.org/10.1063/1.1619223, © 2003 American Institute of Physics.

Shunsuke Kono et al., Detection of up to 20 THz with a lowtemperature-grown GaAs photoconductive antenna gated with 15 fs light pulses, Appl. Phys. Lett. 77, 4104 (2000); https://doi.org/10.1063/1.1333403, © 2000 American Institute of Physics.

Q. Wu, and X.-C. Zhang, Free-space electro-optic sampling of terahertz beams, Appl. Phys. Lett. 67, 3523 (1995) https://doi.org/10.1063/1.114909, © 1995 American Institute of Physics.

Ying Zhang et al., A Broadband THz-TDS System Based on DSTMS Emitter and LTG InGaAs/InAlAs Photoconductive Antenna Detector, Scientific Reports | 6:26949 | DOI: 10.1038/srep26949, Published: May 31, 2016.

Shunsuke Kono et al., Ultrabroadband photoconductive detection: Comparison with free-space electro-optic sampling, Appl. Phys. Lett. 79, 898 (2001); https://doi.org/10.1063/1.1394719, © 2001 American Institute of Physics.

C. Kübler et al., Ultrabroadband detection of multi-terahertz field transients with GaSe electro-optic sensors: Approaching the near infrared, Appl. Phys. Lett. 85, 3360 (2004); doi: 10.1063/1.1808232, © 2004 American Institute of Physics.

Alexei Halpin et al., Enhanced Terahertz Detection Efficiency via Grating-Assisted Noncollinear Electro-Optic Sampling, Physical Review Applied 12, 031003 (2019), DOI: 10.1103/PhysRevApplied.12.031003, © 2019 American Physical Society.

Jianming Dai, Xu Xie, and X.-C. Zhang, Detection of Broadband Terahertz Waves with a Laser-Induced Plasma in Gases, PRL 97, 103903 (2006) Physical Review Letters week ending Sep. 8, 2006, DOI: 10.1103/PhysRevLett.97.103903, © 2006 The American Physical Society.

Xiaofei Lu et al., Broadband terahertz detection with selected gases, A66 J. Opt. Soc. Am. B/vol. 26, No. 9/Sep. 2009, © 2009 Optical Society of America.

Ajay Nahata and Tony F. Heinz, Detection of freely propagating terahertz radiation by use of optical second-harmonic generation, Jan. 1, 1998 / vol. 23, No. 1 / Optics Letters, 67, © 1998 Optical Society of America.

Chia-Yeh Li et al., Broadband field-resolved terahertz detection via laser induced air plasma with controlled optical bias, May 4, 2015 | vol. 23, No. 9 | DOI:10.1364/OE.23.011436 | Optics Express 11436, © 2015 OSA.

(56) References Cited

OTHER PUBLICATIONS

A. Tomasino et al., Invited Article: Ultra-broadband terahertz coherent detection via a silicon nitride-based deep sub-wavelength metallic slit, APL Photonics 3, 110805 (2018); https://doi.org/10.1063/1.5052628, © Author(s) 2018.
Ajay Nahata et al., High-speed electrical sampling using optical second-harmonic generation, Appl. Phys. Lett. 69, 746 (1996); https://doi.org/10.1063/1.117878, © 1996 American Institute of Physics.
T. Bartel et al., Generation of single-cycle THz transients with high electric-field amplitudes, Oct. 15, 2005 / vol. 30, No. 20 / Optics Letters, 2805, © 2005 Optical Society of America.
Mira Naftaly and Richard Dudley, Methodologies for determining the dynamic ranges and signal-to-noise ratios of terahertz time-domain spectrometers, Apr. 15, 2009 / vol. 34, No. 8 / Optics Letters, 1213, © 2009 Optical Society of America.
Yoichi Kawada et al., Carrier envelope phase shifter for broadband terahertz pulses, 986, vol. 41, No. 5 / Mar. 1, 2016 / Optics Letters, 986 Vol. 41, No. 5 / Mar. 1, 2016 / Optics Letters.
Thomas Brabec and Ferenc Krausz, Intense few-cycle laser fields: Frontiers of nonlinear optics, Reviews of Modern Physics, vol. 72, No. 2, Apr. 2000, 545-591, © 2000 The American Physical Society.
P. Cicenas et al., Terahertz radiation from an InAs surface due to lateral photocurrent transients, 5164, vol. 40, No. 22 / Nov. 15, 2015 / Optics Letters, © 2015 Optical Society of America.
Wei Cui et al., Broadband and tunable time-resolved THz system using argon-filled hollow-core photonic crystal fiber, APL Photonics 3, 111301 (2018); https://doi.org/10.1063/1.5043270, © 2018 Author(s).
Riccardo Piccoli et al., Extremely broadband terahertz generation via pulse compression of an Ytterbium laser amplifier, vol. 27, No. 22 / Oct. 28, 2019 / Optics Express, 32659, Journal © 2019.
X. Ropagnol et al., Efficient terahertz generation and detection using CdTe crystal pumped by ultrafast Ytterbium laser, © 2019 IEEE.
P. J. Hale et al., 20 THz broadband generation using semi-insulating GaAs interdigitated photoconductive antennas, Oct. 20, 2014 | vol. 22, No. 21 | DOI:10.1364/OE.22.026358 | Optics Express, 26358, © 2014 Optical Society of America.
Stefan Regensburger et al., Broadband THz detection from 0.1 to 22THz with large area field-effect transistors, Aug. 10, 2015 | vol. 23, No. 16 | DOI:10.1364/OE.23.020732 | Optics Express, 20732, © 2015 Optical Society of America.
Gary S. May, Simon M. Sze, Fundamentals of Semiconductor Fabrication, © 2004 by John Wiley & Sons, Inc.
Jean-Claude Diels, Wolfgang Rudolph, Ultrashort Laser Pulse Phenomena, Fundamentals, Techniques, and Applications on a Femtosecond Time Scale, © 2006, Elsevier Inc.
Grischkowskety al., Far-infrared time-domain spectroscopy with terahertz beams of dielectrics and semiconductors, J. Opt. Soc. Am. B/vol. 7, No. 10/Oct. 1990, 2006, © 1990 Optical Society of America.
Q. Wu et al., Broadband detection capability of ZnTe electro-optic field detectors, Appl. Phys. Lett. 68, 2924 (1996); https://doi.org/10.1063/1.116356, © 1996 American Institute of Physics.
C. Ohlhoff et al., Optical second-harmonic probe for silicon millimeter-wave circuits, Apply Physics Letters, 1996, pp. 1699-1701, vol. 68, AIP Publishing, U.S.A.
D.J. Cook et al., Terahertz-field-induced second-harmonic generation measurements of liquid dynamics, Chemical Physics Letters, 1999, pp. 221-228, vol. 309, Elsevier Science B.V., Nederland.
Chia-Yeh Li et al., Coherent Detection of Terahertz via Laser Induced Plasma with Controlled Optical Bias, CLEO:2013 Technical Digest © OSA 2013.
M. Clerici et al., Spectrally resolved wave-mixing between near- and far-infrared pulses in gas, New Journal of Physics, 2013, pp. 1-13, vol. 15, IOP Publishing Ltd and Deutsche Physikalische Gesellschaft, U.S A.
Jan Kischkat et al., Mid-infrared optical properties of thin films of aluminum oxide, titanium dioxide, silicon dioxide, aluminum nitride, and silicon nitride, Oct. 1, 2012/vol. 51, No. 28/Applied Optics, 6789, © 2012 Optical Society of America.
Michael Bass et al., Handbook of Optics, vol. IV, Optical Properties of Materials, Nonlinear Optics, Quantum Optics, Third Edition, © 2010 The McGraw Hill Companies, Inc.

\* cited by examiner

METHOD AND A SYSTEM FOR HOMODYNE SOLID-STATE BIASED COHERENT DETECTION OF ULTRA-BROADBAND TERAHERTZ PULSES

CROSS REFERENCE TO RELATED APPLICATIONS

This application claims benefit of U.S. provisional application Ser. No. 62/930,771 filed on Nov. 5, 2019. All documents above are incorporated herein in their entirety by reference.

FIELD OF THE INVENTION

The present invention relates to terahertz (THz) radiation spectrometry. More specifically, the present invention is concerned with a method and a system for solid-state detection of ultra-broadband terahertz (THz) pulses.

BACKGROUND OF THE INVENTION

Coherent detection of ultra-broadband THz pulses, covering a two-decade wide frequency range in a range between 0.1- and 10 THz or more, has recently attracted attention for applications where high laser powers are employed to mitigate commonly used detection methods limited to narrower spectral regimes, typically below 4 THz [1]. In particular, mainly gas-based methods have been demonstrated to be suitable alternative to photoconductive switches [9] and methods based on electro-optic crystals [10] which are characterized by long carrier lifetimes, chromatic dispersion, and lattice resonant absorption. Such effects heavily modulate ultra-broadband THz spectra, thus introducing undesired distortions in the THz pulse waveforms. In contrast, gases are lattice-free and continuously regenerated by particles random motion.

THz-Field-Induced Second Harmonic generation (TFISH) in gases [7] has been contemplated to implement coherent detection methods, in view of the simultaneous reconstruction of both amplitude and phase of ultrashort THz pulses. The first attempt has been carried out by Dai et al. [8], who noticed that by increasing the energy of the probe laser interacting with the THz pulse to levels higher than 100 µJ, the TFISH signal was turned from completely incoherent to quasi-coherent. This was due to the beating (interference) between the TFISH signal and a local oscillator (LO) at the same TFISH wavelength generated in the supercontinuum spectral emission of the plasma. For this reason, such a method was named air-breakdown coherent detection.

An improved implementation has been presented by Li et al. [9], where the TFISH signal has been beaten with a local oscillator (LO) signal obtained by frequency-doubling the probe beam in a very thin beta-barium borate (BBO) crystal, hence the name optically-biased coherent detection (OBCD). As a result, the probe energy required to achieve coherent detection was decreased by one order of magnitude.

Further developments and improvements have been achieved by adopting a heterodyne scheme, resulting in the air-biased coherent detection (ABCD) method [2,3]. In this case, the local oscillator (LO) signal was electrically generated by biasing the THz-probe interaction region with a kV voltage source, switching at half of the repetition rate of the THz pulses. The electrical control allows for an easier adjustment of the local oscillator (LO) signal and THz pulse temporal overlap. However, an extremely high voltage source and demanding electronics are required.

Very recently, an evolution of the air-biased coherent detection (ABCD) method referred to as solid-state biased coherent detection (SSBCD) method has been presented [4,6]. In solid-state biased coherent detection (SSBCD) method, the THz-probe interaction is confined in a compact and portable solid-state device, which requires bias voltages and probe energies two and four orders of magnitude lower, respectively, than the ABCD method.

More precisely, air-biased coherent detection (ABCD) [2,3] and solid-state biased coherent detection (SSBCD) methods [4,5,6] currently appear as particularly suitable for the simultaneous and exact reconstruction of both amplitude and phase (coherent detection) of pulses in the ultra-broadband THz spectral regime [1]. Both methods are based on the THz-Field-Induced Second Harmonic generation (TFISH) process [7], where an optical probe beam is frequency doubled while interacting with the THz pulse inside a third-order medium ($\chi^{(3)}$), giving rise to a signal proportional to the THz pulse intensity, as expressed by relation (1) below:

$$I_{TFISH} \propto [\chi^{(3)} I_P]^2 E_{THz}^2, \tag{1}$$

where, $I_P$ and $I_{TFISH}$ are the probe and TFISH signal intensities, respectively, and $E_{THz}$ is the electric field associated with the THz pulse. The TFISH signal expressed in relation (1) is generated with a repetition rate ($f_T$) equal to that of the THz pulse. In order to retrieve the THz pulse phase and amplitude, that is to perform a coherent detection of the THz pulse, an electrically-driven local oscillator (LO) signal is also imposed within the THz-probe interaction region, at the same TFISH central frequency. Such a local oscillator (LO) signal interferes with the TFISH signal itself, leading to a total second harmonic (SH) pulse, the intensity of which is expressed as:

$$I_{SH}^{total} \propto [\chi^{(3)} I_P]^2 (E_{THz} \pm E_{LO})^2 = [\chi^{(3)} I_P]^2 (E_{THz}^2 \pm 2 E_{THz} E_{LO} + E_{LO}^2), \tag{2}$$

where $E_{LO}$ is the electric field associated with the local oscillator (LO) signal, the double sign depending on the relative orientation between the bias and THz electric fields, assuming a parallel polarization for both fields. If the local oscillator (LO) signal is AC-modulated ($E_{LO}^{AC}$) at a frequency equal to half of the THz pulse repetition rate ($f_{LO} = f_T/2$), only the cross term in Relation (2) still features the same modulation frequency $f_{LO}$, and $I_{SH}^{total}$—converted by a photomultiplier tube (PMT) into an electrical signal and then acquired via a lock-in amplifier (LA) synchronized with $f_{LO}$—results in the following readout signal:

$$I_{SH}^{heterodyne} \propto 2 [\chi^{(3)} I_P]^2 E_{THz} E_{LO}^{AC}, \tag{3}$$

where the other two incoherent contributions in Relation (2) proportional to $E_{THz}^2$ and $E_{LO}^2$ are rejected by the lock-in amplifier (LA) filtering action.

This process is called heterodyne detection scheme, as the THz pulse waveform is reconstructed by using a frequency $f_{LO}$ equal to half of the THz pulse repetition rate $f_T$ ($f_{LO} = f_T/2$), $f_{LO} = f_T/2$ as synchronism. In the heterodyne scheme, a square wave voltage, oscillating at $f_T/2$ and phase-locked to the THz pulse repetition rate, has to be generated in order to ensure its temporal overlap with the THz pulse train, which is quite demanding in terms of electronics. Moreover, an electronic circuit consisting of a nonlinear mixer cascaded with a low-pass filter, such as that provided with the front-end of the lock-in amplifier (LIA) must be employed to extract the heterodyne (coherent) signal (see relation (3)

hereinabove). Additionally, common voltage oscillators providing fast-oscillating square wave, above 100 Hz, are relatively noisy due to the switching voltage mechanism, resulting in distortions of the bias waveform when approaching very high peak-to-peak values (slew-rate limited). In turn, this increases background signal fluctuations and affects the actual shape of the THz pulse, thus degrading the performances in terms of signal-to-noise ratio (SNR).

Currently, only air-breakdown coherent detection [8] and optically-biased coherent detection (OBCD) [9], which are both ultra-broadband methods, do not rely on a heterodyne scheme. In both methods, the optically-driven local oscillator (LO) signal is asynchronous with respect to the THz pulse repetition rate, being $f_{LO}$ different from $f_T$. As such, the local oscillator (LO) signal just acts as an offset contribution, which interferes with the TFISH signal. Detection is carried out by using $f_T$ as a synchronism for the lock-in amplifier, according to a homodyne scheme. Under this condition, Relation (2) becomes:

$$I_{SH}^{homodyne} \propto [\chi^{(3)} I_P]^2 (E_{THz}^2 \pm 2E_{THz} E_{LO}^{offset}). \quad (4)$$

In Relation (4), the offset contribution proportional to $(E_{LO}^{offset})^2$, which was present in Relation (2), is here the only term rejected by the filtering action of the lock-in amplifier (LIA). Therefore, since the incoherent contribution due to $E_{THz}^2$ is still present in Relation (4), coherent detection can only be achieved by significantly increasing the local oscillator (LO) signal strength, in such a way that the cross term in Relation (4)—linearly proportional to $E_{THz}$—becomes dominant, thus reducing to Relation 5 as follows:

$$I_{SH}^{homodyne}|_{E_{THz}E_{LO}^{offset} \square E_{THz}^2} \approx 2[\chi^{(3)} I_P]^2 E_{THz} E_{LO}^{offset}. \quad (5)$$

In the case of air-breakdown coherent detection method, the interaction between THz and probe pulses occurs in air. The significantly high probe intensity ionizes the air molecules, thus generating a plasma channel, emitting a supercontinuum spectrum, which extends over an extremely wideband spectral window. The second harmonic (SH) frequency component of the probe pulse present in the supercontinuum plays the role of local oscillator (LO) signal. The brighter the plasma, the higher the local oscillator (LO) strength, until the nature of this detection method turns from incoherent to quasi-coherent, according to Relation (4). However, such a condition is achieved at the expense of an extremely high probe energy, in the order of several hundreds of microjoules. On the one hand, such an energy level has to be spilled from the main beam, limiting the remaining laser energy available for THz generation. On the other hand, plasma generation gives rise to an elevated background noise due to the supercontinuum, which decreases the SNR as the local oscillator (LO) strength increases. In addition, the plasma channel introduces significant distortions in the reconstructed THz waveform, because of some resonant effects. For this reason, it is often referred to such a method as a quasi-coherent detection method.

In the case of OBCD, the local oscillator (LO) signal is obtained by frequency doubling the probe beam in a second-order nonlinear crystal (beta-barium borate, BBO), before it interacts with the THz pulse. Therefore, the local oscillator (LO) strength depends on the second harmonic (SH) generation efficiency, which in turn depends on the BBO crystal length, phase matching condition, and the peak intensity of the probe beam. Relatively thick BBO crystals are not suitable, since chromatic dispersion would excessively broaden the probe pulse duration, thus narrowing the recovered THz bandwidth. In addition, the crystal birefringence would excessively rotate the probe beam polarization with respect to that of the THz pulse, thus decreasing the TFISH generation efficiency. Overall, probe energies in the order of tens of microjoules are still required to achieve the coherent detection regime. Moreover, since probe and second harmonic (SH) pulses travel with different group velocities, it is necessary to insert a series of adjustable optical components in the probe path, in order to achieve their temporal overlap. Finally, since the local oscillator (LO) signal is generated via a second order nonlinear process driven by a highly energetic probe pulse, its power level is typically much higher than that of the TFISH signal in the first place. This results in a significantly high background signal, due to the local oscillator offset, which limits the dynamics (saturation) of the optical detector (for example, a photomultiplier tube, PMT).

Thus, there is still a need in the art for a method and system for a solid-state detection of ultra-broadband terahertz (THz) pulses.

SUMMARY OF THE INVENTION

More specifically, in accordance with the present invention, there is provided a device for homodyne solid-state biased coherent detection of terahertz pulses in a range between 0.1 and 11 THz, the device comprising a metallic slit between, and parallel to, two longitudinal metallic electrodes, deposited on a surface of a substrate, and covered with a layer of nonlinear material, wherein a width of the metallic slit and a thickness of the nonlinear material layer are selected in relation to a central wavelength of the THz pulses.

There is further provide a system for homodyne solid-state biased coherent detection terahertz pulses in a range between 0.1 and 11 THz, comprising a detection device, the detection device comprising a metallic slit between, and parallel to, two longitudinal metallic electrodes deposited on a surface of a substrate, and covered with a layer of nonlinear material; a width of the metallic slit and a thickness of the nonlinear material layer being selected in relation to a central wavelength of the THz pulses; the electrodes being biased by a static DC bias voltage; a THz beam and an optical probe beam being focused onto the metallic slit of the detection device; a photomultiplier tube converting an output of the detection device into an electrical signal, and a lock-in amplifier, synchronized with the THz pulse repetition rate, acquiring said electrical signal, to reconstruct a THz pulses waveform.

There is further provided a method for homodyne solid-state biased coherent detection of terahertz pulses in a range between 0.1 and 11 THz, comprising focusing a THz beam and a pulsed laser beam of pulse energies in a range between 10 and 100 nJ onto a metallic slit provided between metallic electrodes on a surface of a substrate and covered with a layer of nonlinear material; a width of the metallic slit and a thickness of the nonlinear material layer being selected in relation to a central wavelength of the terahertz pulses, and the metallic electrodes being biased by a static DC voltage bias selected in a range between 20 $V_{PP}$ and 200 $V_{PP}$; and retrieving a terahertz pulse waveform using the terahertz pulse repetition rate as synchronism.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 1:
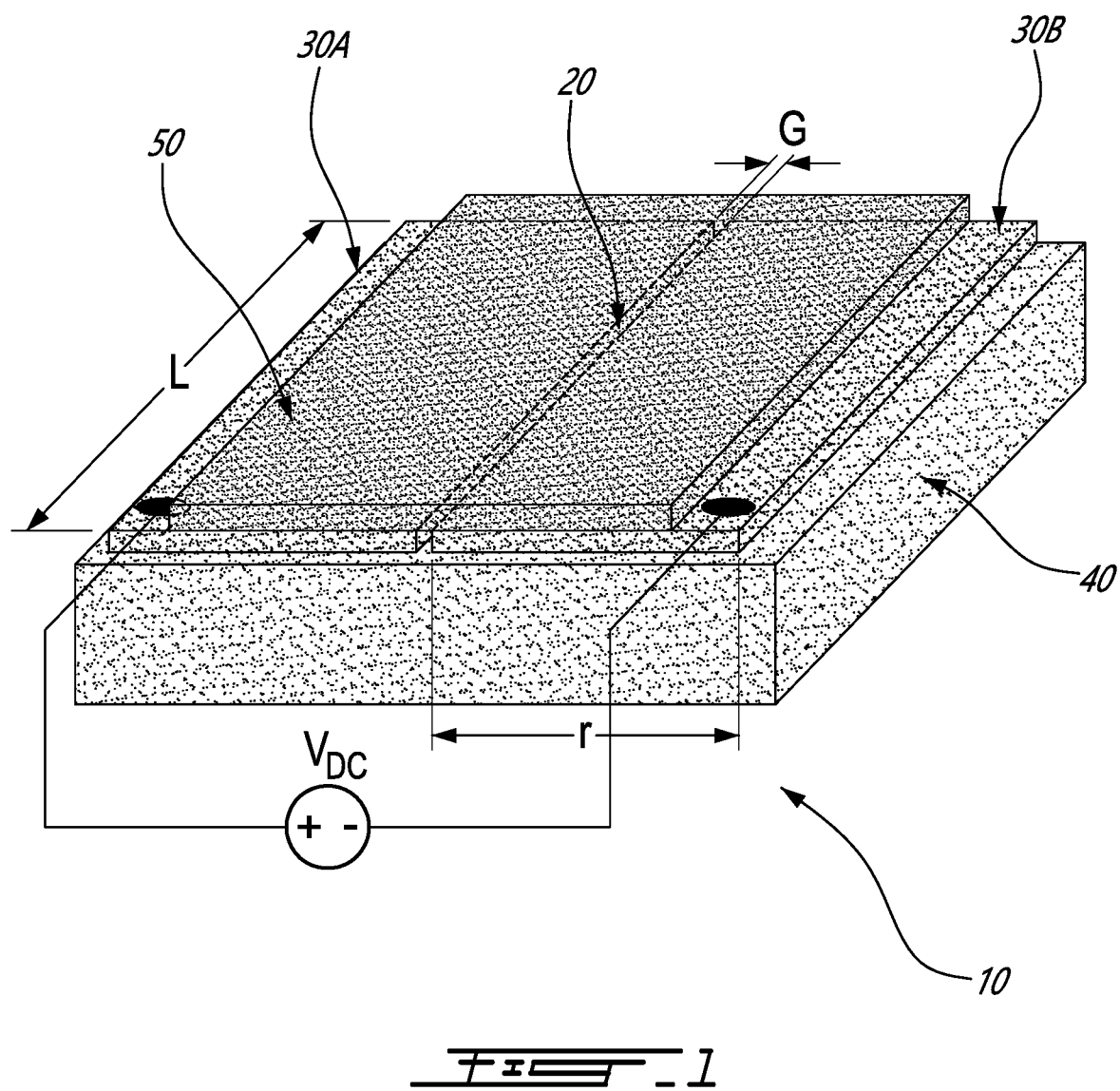
FIG. 1 is a schematic view of a solid-state biased coherent detection (SSBCD) device according to an embodiment of an aspect of the present disclosure.

A device for coherent detection of ultra-broadband terahertz pulses according to an embodiment of an aspect of the present disclosure is shown in FIG. 1. The detection device 10 comprises a metallic slit 20 of a width G formed on the surface of a substrate 40, between, and parallel to, longitudinal metallic electrodes 30A, 30B. A thin layer of nonlinear material 50 covers the metallic slit 20. The width G of the metallic slit and the thickness of the nonlinear material cover layer, for a given thickness of the substrate, are selected in relation to the central wavelength of the THz pulses.

The nonlinear material of the cover layer 50 is selected with a dielectric strength of at least 1 MV/cm.

The detection device 10 may be fabricated via standard CMOS technology. For example, a metallic slab may be formed by sputter deposition on a metallic substrate, the two metallic electrodes 30A, 30B formed by lithography and wet etching techniques, and the nonlinear material layer 50 deposited via plasma-enhanced chemical vapor deposition (PECVD) and then patterned by direct-write laser lithography and plasma etching to clear the external region of the electrodes 30A, 30B, in order to bias ($V_{DC}$) the metallic slit 20 via a pair of contact wires welded thereon.

Figure 2:
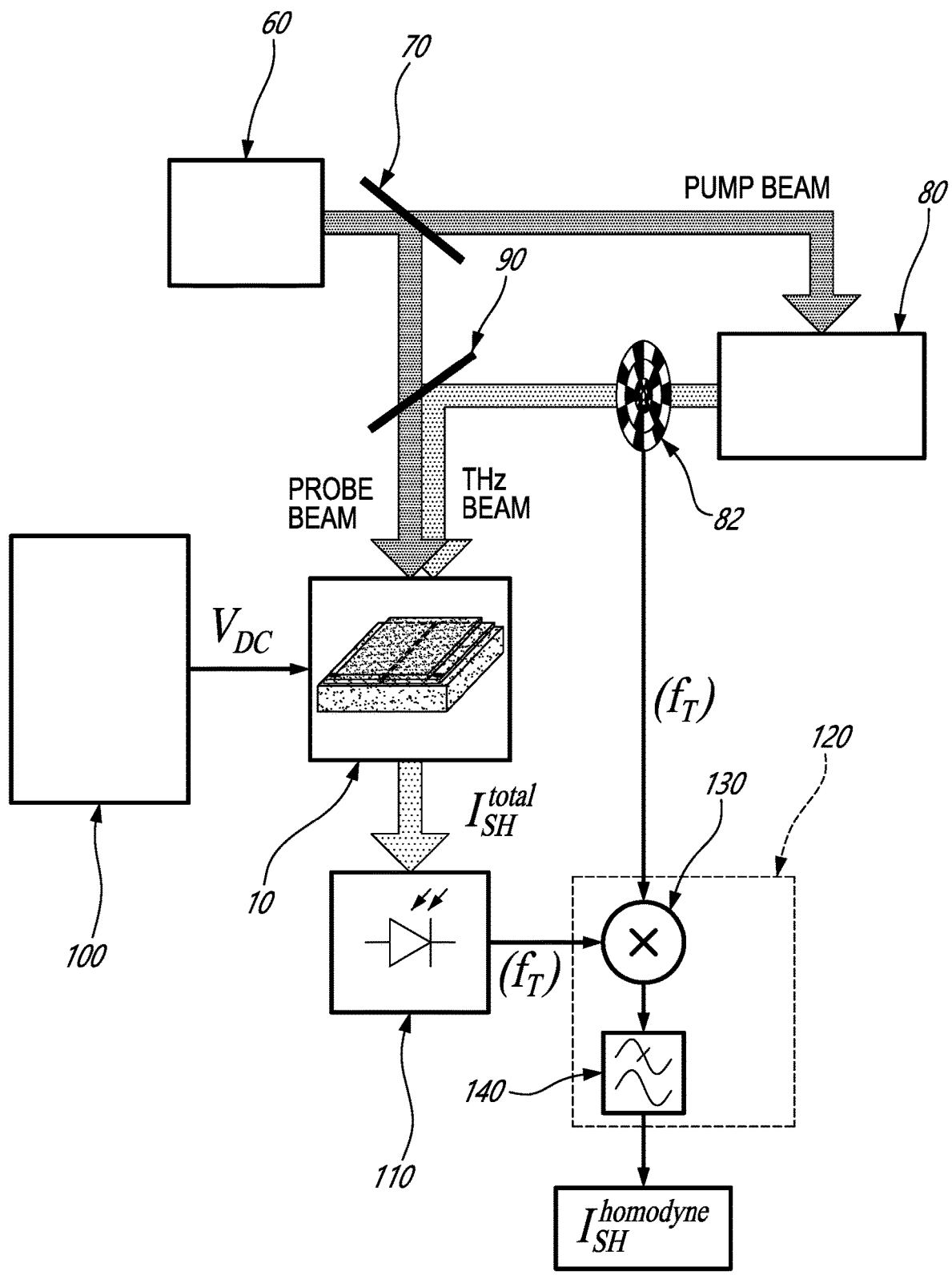
FIG. 2 is a schematic view of a homodyne solid-state-biased coherent detection (SSBCD) system according to an embodiment of an aspect of the present invention.

A system for coherent detection of ultra-broadband terahertz pulses according to an embodiment of an aspect of the present disclosure is illustrated for example in FIG. 2.

A DC (static) bias voltage $V_{DC}$ is independently generated (see DC supply and voltage amplifier 100) and feeds a detection device 10 according to the present disclosure.

Co-propagating THz beam pulses emitted by a THz generator 80 and optical probe beam pulses emitted by a pulsed laser 60 (wavelength 800 nm, repetition rate 1 kHz, pulse duration 150 fs, energy 50 nJ) are focused onto the slit of the detection device 10 (70 and 90 are a beam splitter and a beam combiner respectively). The THz electric field strength in comprised in a range between about 6 and about 100 kV/cm.

In the examples discussed herein, the pulsed laser 60 generates pulses at a wavelength of 800 nm, repetition rate 1 kHz, with pulse duration 150 fs, and energy 50 nJ.

Parameters may be selected as follows: wavelength in a range between about 0.8 µm and about 2 µm, repetition rate in a range between about 10 Hz and about 10 kHz, and pulse duration in a range between about 35 fs and about 150 fs.

The width G of the slit between the two electrodes on the surface of the substrate of the detection device 10 is selected in the range between 400 nanometers and 1 µm and the nonlinear layer has a sub-wavelength thickness, that is several times smaller than the central wavelength of the THz pulse (of about 300 µm), selected in the range between 400 nanometers and 1 µm, in such a way that the THz pulses propagate through the nonlinear layer on an extremely short length, comparable to a fraction of the central wavelength of the THz pulse (of about 300 µm). As a result, the terahertz-field-induced second harmonic generation process occurring within the slit is independent of constraints related to either phase-matching or lattice resonances.

A thickness of the nonlinear layer 50 of at least the width G of the slit was found to prevent the occurrence of discharges induced by the high bias electric fields and spreading out of the slit towards the air above the nonlinear layer material, up to a bias voltage of 200 $V_{PP}$ (peak-to-peak). In the example device 10 discussed herein, the substrate 40 is a quartz substrate of a thickness of 500 µm, the metallic electrodes 30A, 30B are aluminum pads, the width G of the slit is 1 µm and the nonlinear material cover layer 50 is a thin layer of silicon nitride (SiN) of a thickness of 1 µm. The aluminum pad transverse and longitudinal dimensions were selected as r=L=2 mm, so as to completely gather the focused THz beam, which waist size is typically much smaller than 1 mm for a 10-THz-wide THz pulse spectrum.

A photomultiplier tube (PMT) 110 converts the output $I_{SH}^{total}$ of the detection device 10 into an electrical signal, which is then acquired by a lock-in amplifier (LIA) 120 synchronized with the THz pulse repetition rate $f_T$ (see THz chopper 82): the electrical readout of the photomultiplier tube (PMT) 110 is mixed with a reference signal synchronous to the THz pulse repetition rate $f_T$ from the THz generator 80 inside the lock-in amplifier (LIA) 120 (130 and 140 are a mixer and a low-pass filter respectively), in order to extract the heterodyne (coherent) signal. Thus, detection is carried out by using the THz pulse repetition rate $f_T$ as a synchronism for the lock-in amplifier 120, according to a homodyne scheme.

In order to retrieve the THz pulse phase, that is to perform a coherent detection of the THz pulse, an electrically-driven local oscillator (LO) signal is superimposed within the detection device 10 where the interaction between the THz beam and the probe beam takes place. The metallic electrodes of the detection device 10 are biased by the static DC voltage $V_{DC}$, that is, non-switching. Since the two metallic electrodes are separated by the slit 20 of the detection device 10, which is a very narrow gap that is several times smaller than the THz wavelength, significantly high bias DC electric fields $E_{DC}$ are generated by applying relatively low bias voltages $V_{DC}$.

In the above example of a slit of a width G of 1 µm, and a 1 µm-thick N cover layer of a dielectric constant of about 6.5, an applied bias voltage $V_{DC}$=50 V generates a DC electric field strength of $E_{DC}$=80 kV/cm. While interacting with the probe pulse, such an elevated DC field generates the local oscillator (LO) signal according to a process analogous to THz-Field-Induced Second Harmonic (TFISH) generation, yet driven by a static electric field. A local oscillator (LO) strength that overwhelms the strength of the THz-Field-Induced Second Harmonic (TFISH) signal, thus fulfilling the condition required for coherent detection (SSBCD) method (see Relation (4) hereinabove), is achieved by selecting the DC bias voltage $V_{DC}$ of the electrodes of the detection device 10.

Figure 3:
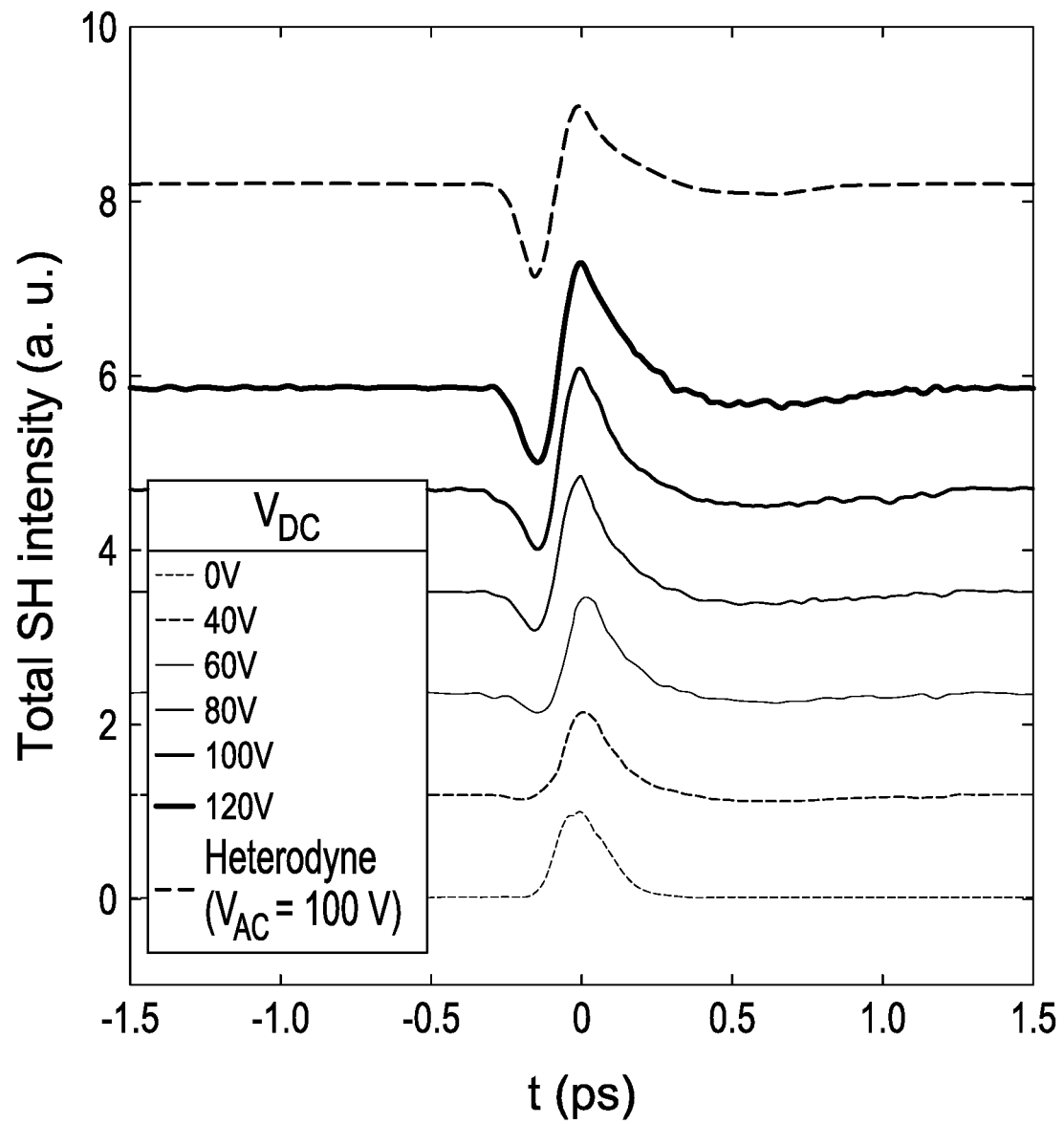
FIG. 3 shows a readout signal detected via the homodyne solid-state biased coherent detection (SSBCD) for different DC bias voltages, according to an embodiment of an aspect of the present disclosure.
Figure 5:
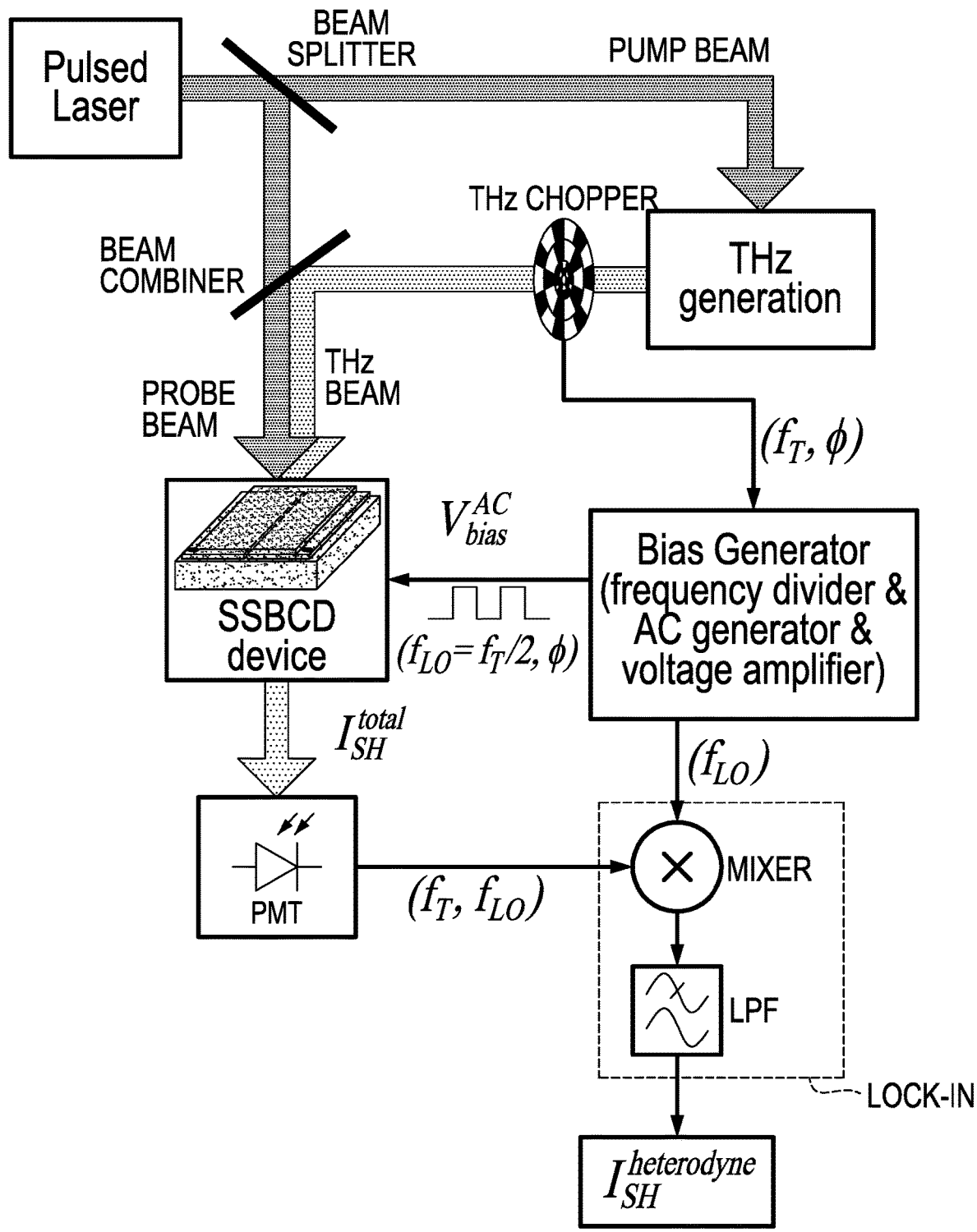
FIG. 5 is a schematic view of an heterodyne solid-state biased coherent detection (SSBCD) system as known in the art.

FIG. 3 shows readout signals detected via homodyne solid-state biased coherent detection (SSBCD) as a function of the DC bias voltage $V_{DC}$, for a THz electric field strength of $E_{THz}$=50 kV/cm. The THz waveform recorded via heterodyne solid-state biased coherent detection (SSBCD) is shown for comparison ($V_{AC}$=100V; see FIG. 5 discussed hereinbelow). Curves are shifted along the y-axis for clarity and normalized to the peak of the curve acquired at 0 V.

When the local oscillator (LO) signal is generated by an applied bias voltage $V_{DC}$ higher than 100 V, corresponding to a generated DC electric field strength $E_{DC}$=160 kV/cm, which is about three times higher than the electric field associated with the THz pulse $E_{THz}$, the phase of the THz pulse is recovered, as confirmed by the comparison with the waveform reconstructed via standard heterodyne solid-state biased coherent detection (SSBCD).

Figure 4:
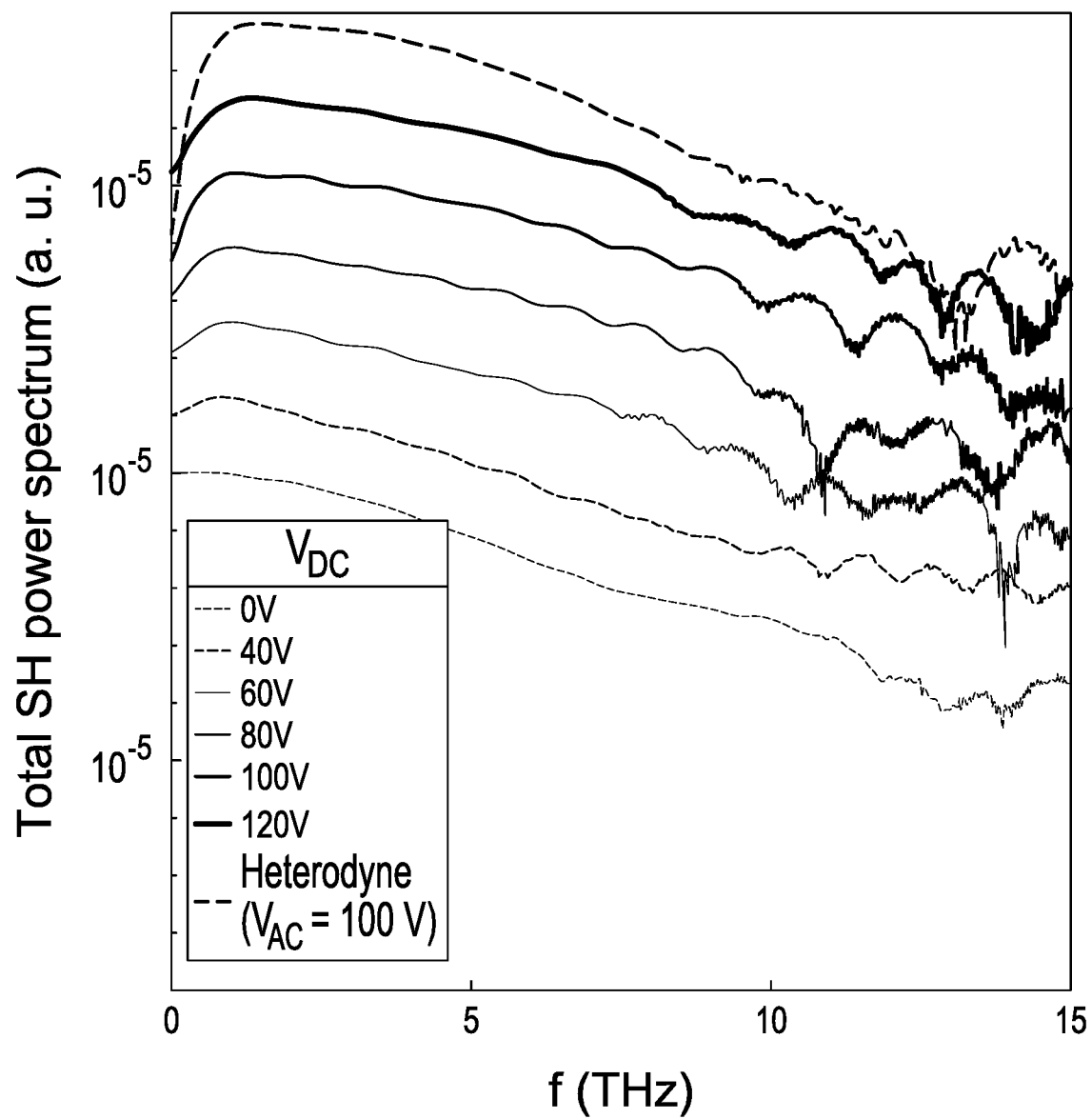
FIG. 4 shows FFT-evaluated spectra of the THz waveforms in FIG. 3, for different DC bias voltages, according to an embodiment of an aspect of the present disclosure.

FIG. 4 shows the ultra-broadband THz spectra of the detected THz pulses in FIG. 3. The Fast Fourier Transform (FFT)—evaluated spectra of the THz waveforms in FIG. 3 is shown as a function of the DC bias voltage. Curves are vertically offset for clarity and normalized to each respective maximum.

There is thus demonstrated an electrically-driven homodyne THz detection method, using the THz-Field-Induced Second Harmonic (TFISH) effect occurring in the detection device. The method provides a gap-less spectral response wider than 10 THz, in terms of operating bandwidth i. e. in a range between about 0.1 and about 11 THz for an optical pulse duration of 140 fs, by applying bias voltages in the range between about 20V and 200 $V_{PP\ (peak\ to\ peak)}$ and pulse energies of the pulsed laser beam in the range between about 10 and about 100 nJ, thus combining the advantages of a solid-state ultra-broadband detection and the advantages of a homodyne detection, using commonly available and easily affordable electronics instrumentation.

The present detection device, detection system and detection method are illustrated hereinabove in the case of a SiN cover layer and a 1-µm-wide metallic slit. The width of the slit of the detection device may be selected in a range between about 0.5 µm to about 1 µm, for generating a local oscillator LO signal strength higher than the strength of the THz-Field-Induced Second Harmonic (TFISH) signal so as to fulfill Relation (5), through selecting the DC bias voltage of the metallic electrodes of the detection device.

In heterodyne solid-state biased coherent detection (SSBCD) method and system as known in the art and discussed in the Background section above, an electronic circuit divides the THz pulse repetition rate by two and accordingly generates an AC square wave bias voltage, phase-locked to the THz pulse train. A synchronism signal at the bias modulation frequency is mixed with the photomultiplier tube (PMT) electrical readout, inside the lock-in amplifier (LIA), in order to extract the heterodyne (coherent) signal. LPF refers to a low-pass filter (see FIG. 5).

In contrast, the present system and method do not require an external electronic circuit to generate a bias voltage with modulation frequency equal to half of the THz pulse repetition rate and phase-locked with the THz pulse train. In comparison, the non-oscillating (DC) nature of the bias voltage applied to the solid-state device in the present system and method results in a significant decrease of the electrical noise contribution that would affect the recorded THz waveforms, since the electronics (voltage amplifiers) providing the DC bias voltage are not used to generate fast-switching square wave voltages. A DC bias voltage in the range between about 20 and about 200 $VV_{PP\ (peak\ to\ peak)}$ is generated using cost-effective and portable power supplies, such as compact electrical circuits based on charge pumps, which do not necessarily need a further voltage amplifier stage, thus further improving the overall noise performance.

In the solid state detection device example discussed hereinabove in relation to FIG. 1, with a dielectric strength of the nonlinear cover material of about 6 MV/cm, the 1-µm-wide metallic slit can withstand static electric fields in the order of 100 kV/cm, generated by applying voltages $V_{DC}$ as low as 50 V to the device. This allows to achieve a very high local oscillator (LO) strength necessary to operate the homodyne mechanism.

Since no plasma is generated, no distortions are introduced in the recorded THz waves shown see for example in FIGS. 3 and 4).

The local oscillator (LO) signal can be quantified in terms of bias electric field strength $E_{DC}$ generated within the slit, which allows to straightforwardly compare the local oscillator (LO) strength with the THz electric field ($E_{THz}$) and accurately adjust the DC bias voltage $V_{DC}$ to satisfy the condition $E_{DC} \gg E_{THz}$ in Relation 5 hereinabove and operate the homodyne scheme.

Since the local oscillator (LO) signal is generated inside the detection device at the same time as the THz-Field-Induced Second Harmonic (TFISH) signal, there is no time delay to compensate with either laser probe pulse or THz pulse. Therefore, no additional optical components are required in the probe path.

The local oscillator (LO) signal is generated according to a process very similar to the THz-Field-Induced Second Harmonic (TFISH) mechanism, using probe energies in the range between about 10 and about 100 nJ, and the readout signal is obtained with minimized background incoherent signal, thus allowing to exploit the full dynamics of the photomultiplier tube (PMT) used to acquire and to reach a high signal-to-noise-ratio (SNR).

There is thus provided a device, a system and a method for homodyne solid-state biased coherent detection (SSBCD) of ultra-broadband terahertz (THz) pulses, in a range between 0.1 and 10 THz.

The present method and system for detection of ultra-broadband terahertz (THz) pulses are operated at low probe energy, in the range between about 10 and about 100 nJ, and bias voltages, in the range between about 20V and 200 $V_{PP\ (peak\ to\ peak)}$, affordably generated with simple and off-of-the-shelf devices, such as common laser oscillators and battery-fed bias systems.

The scope of the claims should not be limited by the embodiments set forth in the examples, but should be given the broadest interpretation consistent with the description as a whole.

REFERENCES

[1] M. Tonouchi, Nat. Photonics 1, 97 (2007).
[2] N. Karpowicz, J. Dai, X. Lu, Y. Chen, M. Yamaguchi, H. Zhao, X.-C. Zhang, L. Zhang, C. Zhang, M. Price-Gallagher, C. Fletcher. O. Mamer, A. Lesimple, K. Johnson, Appl. Phys. Lett. 92, 011131 (2008).
[3] Karpowicz et al., Compact terahertz spectrometer using optical beam recycling and heterodyne detection, US20090066948 A1.

[4] A. Tomasino, A. Mazhorova, M. Clerici, M. Peccianti, S.-P. Ho, Y. Jestin, A. Pasquazi, A. Markov, X. Jin, R. Piccoli, S. Delprat, M. Chaker, A. Busacca, J. Ali, L. Razzari, and R. Morandotti, Optica 4, 1358 (2017).

[5] A. Tomasino, R. Piccoli, Y. Jestin, S. Delprat, M. Chaker, M. Peccianti, M. Clerici, A. Busacca, L. Razzari, R. Morandotti, APL Photonics 3, 110805 (2018)

[6] M. Clerici et al., Fully-coherent terahertz detection method and system, U.S. Pat. No. 9,823,124B2.

[7] X. Lu, N. Karpowicz, X.-C. Zhang, J. Opt. Soc. B 26, A66 (2009)

[8] J. Dai, X. Xie, X.-C. Zhang, Phys. Rev. Lett. 97, 103903 (2006).

[9] C.-Y Li, D. Seletskiy, Z. Yang, S.-B. Mansoor, Opt. Express 23, 11436 (2015).

[10] D. Grischkowsky, S. Keiding, M. Exter, C. Fattinger, J. Opt. Soc. B 7, 2006 (1990).

[11] Q. Wu, M. Litz, X.-C. Zhang, Appl. Phys. Lett. 68, 2924 (1996).

The invention claimed is:

1. A device for homodyne solid-state biased coherent detection of terahertz pulses in a range between 0.1 and 11 THz, the device comprising a metallic slit between, and parallel to, two longitudinal metallic electrodes, deposited on a surface of a substrate, and covered with a layer of nonlinear material, wherein a width of the metallic slit and a thickness of the nonlinear material layer are selected in relation to a central wavelength of the THz pulses, wherein the width of the metallic slit is selected in a range between 400 nanometers and 1 µm and the thickness of the layer of nonlinear material is selected in a range between 400 nanometers and 1 µm.

2. The device of claim 1, wherein the nonlinear material has a dielectric strength of at least 1 MV/cm.

3. The device of claim 1, wherein the thickness of the layer of nonlinear material is at least equal to the width of the metallic slit.

4. The device of claim 1, wherein the substrate is a quartz substrate of a thickness of 500 1 µm, the metallic electrodes are aluminum pads of transverse and longitudinal dimensions 2 mm, the width of the slit is 1 µm, and the layer of nonlinear material is a layer of silicon nitride of a thickness of 1 µm.

5. A system for homodyne solid-state biased coherent detection terahertz pulses in a range between 0.1 and 11 THz, comprising a detection device, the detection device comprising a metallic slit between, and parallel to, two longitudinal metallic electrodes deposited on a surface of a substrate, and covered with a layer of nonlinear material; a width of the metallic slit and a thickness of the nonlinear material layer being selected in relation to a central wavelength of the THz pulses; the electrodes being biased by a static DC bias voltage; a THz beam and an optical probe beam being focused onto the metallic slit of the detection device; a photomultiplier tube converting an output of the detection device into an electrical signal, and a lock-in amplifier, synchronized with the THz pulse repetition rate, acquiring said electrical signal, to reconstruct a THz pulses waveform.

6. The system of claim 5, comprising a THz source; a pulsed laser source; a focusing unit; and a DC voltage supply; said DC voltage supply applying the static DC bias voltage to the electrodes; said focusing unit focuses the THz beam emitted by said THz source and the optical probe beam emitted by said pulsed laser source onto the metallic slit of the detection device.

7. The system of claim 5, wherein the width of the metallic slit is selected in a range between 400 nanometers and 1 µm and the thickness of the layer of nonlinear material is selected in a range between 400 nanometers and 1 µm.

8. The system of claim 5, wherein the nonlinear material has a dielectric strength of at least 1 MV/cm.

9. The system of claim 5, wherein the probe beam pulses have a wavelength in a range between 0.8 µm and 2 µm, a repetition rate in a range between 10 Hz and 10 kHz, and pulse duration in a range between 35 fs and 150 fs and energies in a range between 10 and 100 nJ.

10. The system of claim 5, wherein the probe beam pulses have a wavelength of 800 nm, a repetition rate of 1 kHz, a pulse duration of 150 fs and energies in a range between 10 and 100 nJ.

11. The system of claim 5, wherein the probe beam pulses have a wavelength of 800 nm, with a repetition rate of 1 kHz, a pulse duration 150 fs and an energy of 50 nJ.

12. The system of claim 5, wherein the thickness of the layer of nonlinear material is at least the width of the metallic slit, and the bias DC voltage applied to the metallic electrodes is at most 200 $V_{pp}$.

13. The system of claim 5, wherein the substrate is a quartz substrate of a thickness of 500 µm, the metallic electrodes are aluminum pads of transverse and longitudinal dimensions 2 mm, the width of the slit is 1 µm, the layer of nonlinear material is a layer of silicon nitride of a thickness of 1 µm, and the static DC bias voltage applied to the electrodes is selected in a range between 20V and 200 $V_{PP}$.

14. The system of claim 5, wherein the static DC bias voltage applied to the electrodes is comprised in a range between 20 V and 200 $V_{PP}$, the THz electric field THz is comprised in a range between 6 and 100 kV/cm, and the probe beam has pulse energies in a range between 10 and 100 nJ.

15. A method for homodyne solid-state biased coherent detection of terahertz pulses in a range between 0.1 and 11 THz, comprising focusing a THz beam and a pulsed laser beam of pulse energies in a range between 10 and 100 nJ onto a metallic slit provided between metallic electrodes on a surface of a substrate and covered with a layer of nonlinear material; a width of the metallic slit and a thickness of the nonlinear material layer being selected in relation to a central wavelength of the terahertz pulses, and the metallic electrodes being biased by a static DC voltage bias selected in a range between 20 $V_{PP}$ and 200 $V_{PP}$; and retrieving a terahertz pulse waveform using the terahertz pulse repetition rate as synchronism.

16. The method of claim 15, wherein said DC bias voltage generates a DC electric field within the metallic slit, and the pulsed laser beam interacting with the DC electric field generates a local oscillator signal of a strength $E_{DC}$, with $E_{DC} \gg E_{THz}$ where $E_{THz}$ is the strength of the THz electric field, the THz electric field THz being comprised in a range between 6 and 100 kV/cm.

17. The method of claim 15, wherein the probe beam pulses have a wavelength of 800 nm, a repetition rate of 1 kHz, a pulse duration of 150 fs and energies in a range between 10 and 100 nJ.

18. The method of claim 15, comprising selecting the width of the metallic slit in a range between 400 nanometers and 1 µm and the thickness of the layer of nonlinear material in a range between 400 nanometers and 1 µm.

19. The method of claim 15, comprising selecting the thickness of the layer of nonlinear material of at least the width of the metallic slit.

* * * * *